United States Patent
Bauer

(10) Patent No.: US 10,009,416 B2
(45) Date of Patent: Jun. 26, 2018

(54) PERFECT APPLICATION CAPACITY ANALYSIS FOR ELASTIC CAPACITY MANAGEMENT OF CLOUD-BASED APPLICATIONS

(71) Applicant: Eric J. Bauer, Freehold, NJ (US)

(72) Inventor: Eric J. Bauer, Freehold, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 31 days.

(21) Appl. No.: 14/684,413

(22) Filed: Apr. 12, 2015

(65) Prior Publication Data

US 2016/0301746 A1    Oct. 13, 2016

(51) Int. Cl.
*G06F 13/00* (2006.01)
*H04L 29/08* (2006.01)
(Continued)

(52) U.S. Cl.
CPC ........... *H04L 67/10* (2013.01); *G06F 9/50* (2013.01); *H04L 41/0893* (2013.01); *H04L 41/5096* (2013.01)

(58) Field of Classification Search
CPC ..... H04L 67/1008; H04L 67/16; H04L 67/42; H04L 67/10; H04L 41/5096; H04L 41/0893; G06F 9/50
(Continued)

(56) References Cited

U.S. PATENT DOCUMENTS

| | | | | |
|---|---|---|---|---|
| 9,202,225 | B2* | 12/2015 | Ferris | ...................... G06F 11/34 |
| 2011/0295727 | A1* | 12/2011 | Ferris | ...................... G06F 11/34 705/34 |

(Continued)

OTHER PUBLICATIONS

Gisin, et al., "'Perfect Dispatch'—as the Measure of PJM Real Time Grid Operational Performance," Proceedings of the IEEE PES 2010 General Meeting, Jul. 25-29, 2010, 8 pages.
(Continued)

*Primary Examiner* — Kenneth R Coulter
(74) *Attorney, Agent, or Firm* — Tong, Rea, Bentley & Kim, LLC

(57) ABSTRACT

A capability for perfect application capacity analysis for elastic capacity management of a cloud-based application is presented. The capability for perfect application capacity analysis for elastic capacity management of a cloud-based application may support use of perfect application capacity analysis to identify opportunities for improvements in elastic capacity management of the cloud-based application. The capability for perfect application capacity analysis for elastic capacity management of a cloud-based application may include receiving historical application demand and capacity data for the cloud-based application, determining a set of constraints associated with the cloud-based application, determining perfect application capacity data for the cloud-based application based on the historical application demand data for the cloud-based application and the set of constraints associated with the cloud-based application, and identifying, based on the historical application capacity data for the cloud-based application and the perfect application capacity data for the cloud-based application, an opportunity to improve elastic capacity management for the cloud-based application.

21 Claims, 6 Drawing Sheets

(51) Int. Cl.
*G06F 9/50* (2006.01)
*H04L 12/24* (2006.01)

(58) Field of Classification Search
USPC .............. 709/224, 223, 220–222, 230–235
See application file for complete search history.

(56) References Cited

U.S. PATENT DOCUMENTS

2012/0254443 A1* 10/2012 Ueda .................. H04L 67/1008
709/226
2014/0351429 A1* 11/2014 Madani ............... H04L 67/1097
709/224

OTHER PUBLICATIONS

PJM, "Perfect Dispatch," Feb. 6, 2014, downloaded from www.pjm.com, 1 page.

* cited by examiner

PERFECT APPLICATION CAPACITY ANALYSIS FOR ELASTIC CAPACITY MANAGEMENT OF CLOUD-BASED APPLICATIONS

TECHNICAL FIELD

The disclosure relates generally to cloud-based applications and, more specifically but not exclusively, to supporting elastic capacity management of cloud-based applications.

BACKGROUND

Cloud computing providers may provide many types of cloud-based services, such as infrastructure-as-a-service (IaaS), platform-as-a-service (PaaS), and so forth. The cloud-based services may be supported by cloud resources of the cloud computing providers, which may include physical resources and associated virtual resources implemented via those physical resources. The cloud-based services provided by cloud computing providers may be used by application service providers to provide cloud-based applications which may be supported by the cloud resources of the cloud computing providers. For example, cloud-based applications may include cloud-based e-mail applications, virtual desktop applications, virtual collaboration applications, and many others. The cloud-based applications provided by application service providers support application services which may be provided to application end users. The application service capacity of cloud-based applications is supported by application resource capacity of the cloud-based applications (e.g., in terms of virtual machines (VMs) or other virtual resource components which may provide application resource capacity) that is supported by cloud resources of the cloud computing providers. The application resource capacity made available for supporting application service capacity of cloud-based applications may be controlled using capacity management mechanisms, including elastic capacity management mechanisms. Disadvantageously, however, there are various deficiencies associated with existing elastic capacity management mechanisms for elastic capacity management for cloud-based applications.

SUMMARY OF EMBODIMENTS

Various deficiencies in the prior art may be addressed by embodiments for supporting elastic capacity management of a cloud-based application based on perfect application capacity analysis for the cloud-based application.

In at least some embodiments, an apparatus includes a processor and a memory communicatively connected to the processor, wherein the processor is configured to receive historical application demand data for a cloud-based application, determine a set of constraints associated with the cloud-based application, determine perfect application capacity data for the cloud-based application based on the historical application demand data for the cloud-based application and the set of constraints associated with the cloud-based application, and identify, based on the perfect application capacity data for the cloud-based application, an opportunity to improve elastic capacity management for the cloud-based application.

In at least some embodiments, a non-transitory computer-readable storage medium stores instructions which, when executed by a computer, cause the computer to perform a method that includes receiving historical application demand data for a cloud-based application, determining a set of constraints associated with the cloud-based application, determining perfect application capacity data for the cloud-based application based on the historical application demand data for the cloud-based application and the set of constraints associated with the cloud-based application, and identifying, based on the perfect application capacity data for the cloud-based application, an opportunity to improve elastic capacity management for the cloud-based application.

In at least some embodiments, a method includes receiving historical application demand data for a cloud-based application, determining a set of constraints associated with the cloud-based application, determining perfect application capacity data for the cloud-based application based on the historical application demand data for the cloud-based application and the set of constraints associated with the cloud-based application, and identifying, based on the perfect application capacity data for the cloud-based application, an opportunity to improve elastic capacity management for the cloud-based application.

BRIEF DESCRIPTION OF THE DRAWINGS

The teachings herein can be readily understood by considering the detailed description in conjunction with the accompanying drawings, in which.

To facilitate understanding, identical reference numerals have been used, where possible, to designate identical elements that are common to the figures.

DETAILED DESCRIPTION OF EMBODIMENTS

In general, a capability for perfect application capacity analysis for elastic capacity management of a cloud-based application is presented. The capability for perfect application capacity analysis for elastic capacity management of a cloud-based application may support use of perfect application capacity analysis to identify opportunities for improvements in elastic capacity management of the cloud-based application. The capability for perfect application capacity analysis for elastic capacity management of a cloud-based application may include receiving historical application data of the cloud-based application (e.g., historical application capacity data, historical application demand data, or the like, as well as various combinations thereof), determining constraints associated with the cloud-based application (e.g., one or more operational constraints, one or more process constraints, one or more policy constraints, one or more architectural constraints, or the like, as well as various combinations thereof), determining perfect application capacity data for the cloud-based application (e.g., one or more types of perfect application capacity data, such as economically perfect application capacity data, technically perfect application capacity data, other types of perfect application capacity data, or the like, as well as various combinations thereof) based on the historical application demand data and the constraints associated with the cloud-based application, and identifying one or more opportunities for improvement of elastic capacity management of the cloud-based application based on the perfect application capacity data of the cloud-based application. The opportunity for improvement of elastic capacity management of the cloud-based application may include one or more of an opportunity for an operational improvement, an opportunity for a process improvement, an opportunity for a policy improvement, an opportunity for an architectural improvement, or the like, as well as various combinations thereof). The opportunity for improvement of elastic capacity management of the cloud-based application may be represented in various ways (e.g., using a text-based representation, using a graphical representation, or the like, as well as various combinations thereof). The opportunity for improvement of elastic capacity management of the cloud-based application may be analyzed to identify one or more improvements for elastic capacity management of the cloud-based application (e.g., one or more operational improvements, one or more process improvements, one or more policy improvements, one or more architectural improvements, or the like, as well as various combinations thereof). These and various other embodiments and potential advantages of the capability for perfect application capacity analysis for elastic capacity management of a cloud-based application may be further understood by way of reference to the exemplary system of FIG. 1.

Figure 1:
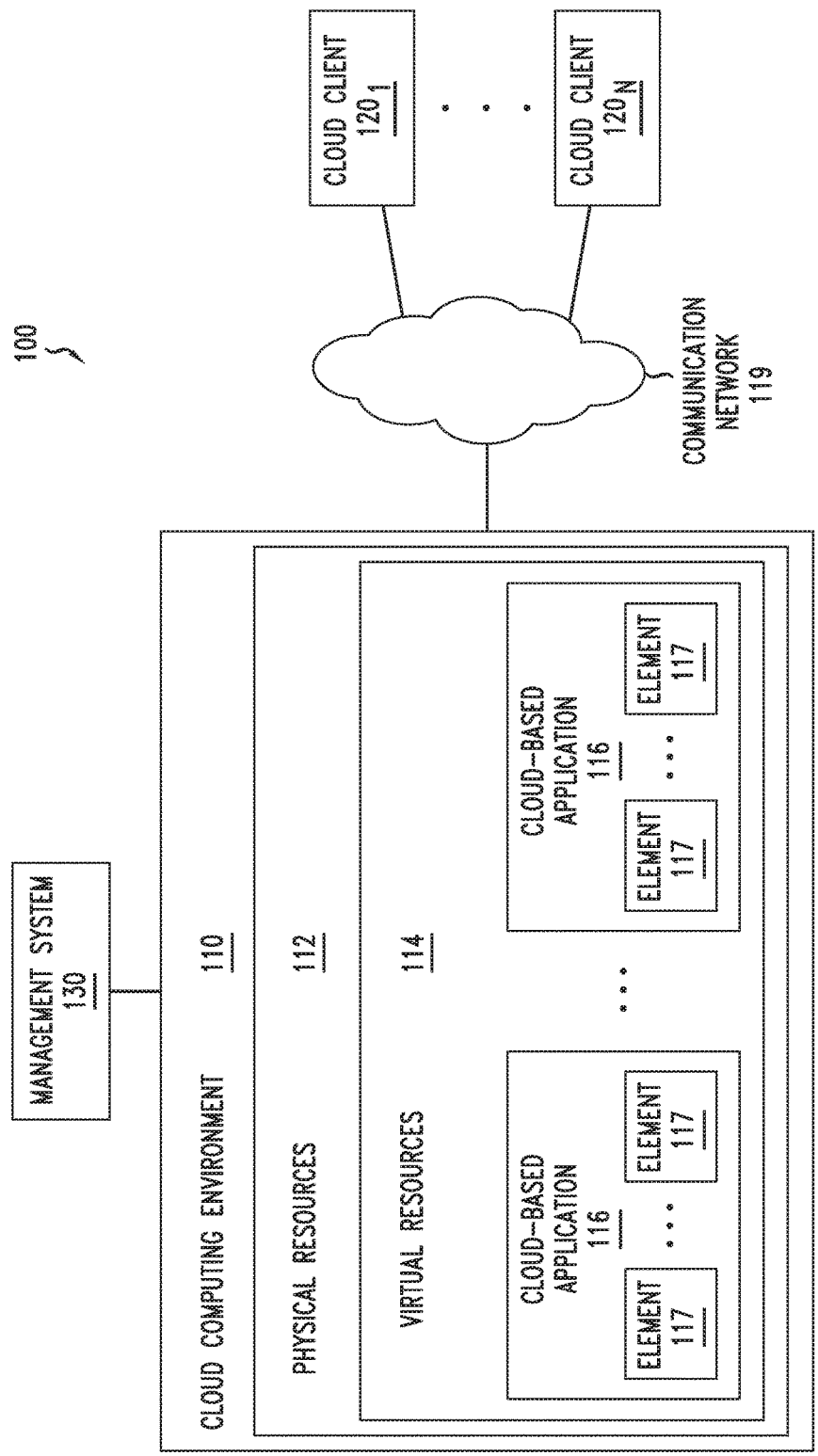
FIG. 1 depicts an exemplary system including a cloud computing environment and a management system configured to support perfect application capacity analysis for cloud-based applications of the cloud computing environment.

FIG. 1 depicts an exemplary system including a cloud computing environment and a management system configured to support perfect application capacity analysis for cloud-based applications of the cloud computing environment.

The exemplary system 100 includes a cloud computing environment 110, a set of cloud clients $120_1$-$120_N$ (collectively, cloud clients 120), and a management system 130.

The cloud computing environment 110 includes physical resources 112 configured to support virtual resource 114. The physical resources 112 may include various types of physical equipment which may be deployed in a cloud computing environment, such as servers, processors, memories, storage devices, communication equipment (e.g., switches, routers, communication links, or the like), or the like, as well as various combinations thereof. The virtual resources 114 may include various types of virtual resources which may be supported by a cloud computing environment (e.g., virtual processing resources, virtual memory resources, virtual storage resources, virtual communication resources, virtual machines (VMs), or the like, as well as various combinations thereof.

The cloud computing environment 110 is configured to support cloud-based services, such as infrastructure-as-a-service (IaaS), platform-as-a-service (PaaS), and so forth. The cloud-based services may be supported by cloud resources of the cloud computing environment 110 (namely, physical resources 112 and the virtual resources 114 supported by those physical resources 112). The cloud-based services of cloud computing environment 110 may be used by application service providers to provide cloud-based applications 116 which may be supported by the cloud resources of the cloud computing environment 110. For example, cloud-based applications 116 may include cloud-based e-mail applications, virtual desktop applications, virtual collaboration applications, and many others. The cloud-based applications 116 provided by application service providers support application services which may be provided to application end users (e.g., via cloud clients 120). The application service capacity of cloud-based applications 116 is supported by application resource capacity of the cloud-based applications 116. In FIG. 1, the application resource capacity of a cloud-based application 116 is represented as a set of elements 117 which represents the capability to dynamically modify the application resource capacity of the cloud-based application 116 based on elastic capacity management mechanisms. For some cloud-based applications, the elements 117 may represent application components (virtual machines (VMs) or other types of virtual application components which may provide application resource capacity) such that the cloud-based applications 116 may dynamically grow or shrink application component capacity by dynamically increasing or decreasing the number of application components, dynamically increasing or decreasing the sizes of application components (e.g., using elastic virtual resources), or the like, as well as various combinations thereof. For some cloud-based applications, the elements 117 may represent instances of the application such that the cloud-based applications 116 may dynamically grow or shrink application component capacity by dynamically increasing or decreasing the number of application instances, dynamically increasing or decreasing the sizes of application instances (e.g., in terms of the numbers of application components), or the like, as well as various combinations thereof. More generally, it will be appreciated that that cloud-based applications 116 may dynamically grow or shrink their online application resource capacity by dynamically allocating or releasing cloud resources based on elastic capacity management mechanisms. As discussed further below, the typical goal of elastic capacity management for a cloud-based application 116 is to serve application demand of the cloud-based application 116 without wasting application capacity (e.g., holding excess online application capacity for the cloud-based application 116). The cloud clients 120 are configured to utilize cloud-based applications 116 supported by cloud-based environment 110. The cloud clients 120 may access the cloud-based applications 116 via various types of communication network (illustratively, communication network 119). For example, cloud clients 120 may include desktop computers, laptop computers, notebook computers, tablet computers, smartphones, thin clients, network devices, virtual elements, or the like. The use of cloud-based applications 116 by the cloud clients 120 results in application demand for the cloud-based applications 116.

The management system 130 is configured to support perfect application capacity analysis for identifying opportunities to improve elastic capacity management of the cloud-based applications 116 of cloud computing environment 110. The management system 130 may be configured to identify an opportunity to improve elastic capacity management of a cloud-based application 116 of cloud computing environment 110 by receiving historical application data for cloud-based application (including historical application demand data for the cloud-based application 116 and historical application capacity data for the cloud-based application 116), determining constraints associated with the cloud-based application 116, determining perfect application capacity data for the cloud-based application 116 based on the historical application demand data for the cloud-based application 116 and the constraints associated with the cloud-based application 116, and identifying, based on the perfect application capacity data for the cloud-based application 116, an opportunity to improve elastic capacity management for the cloud-based application 116.

Figure 2:
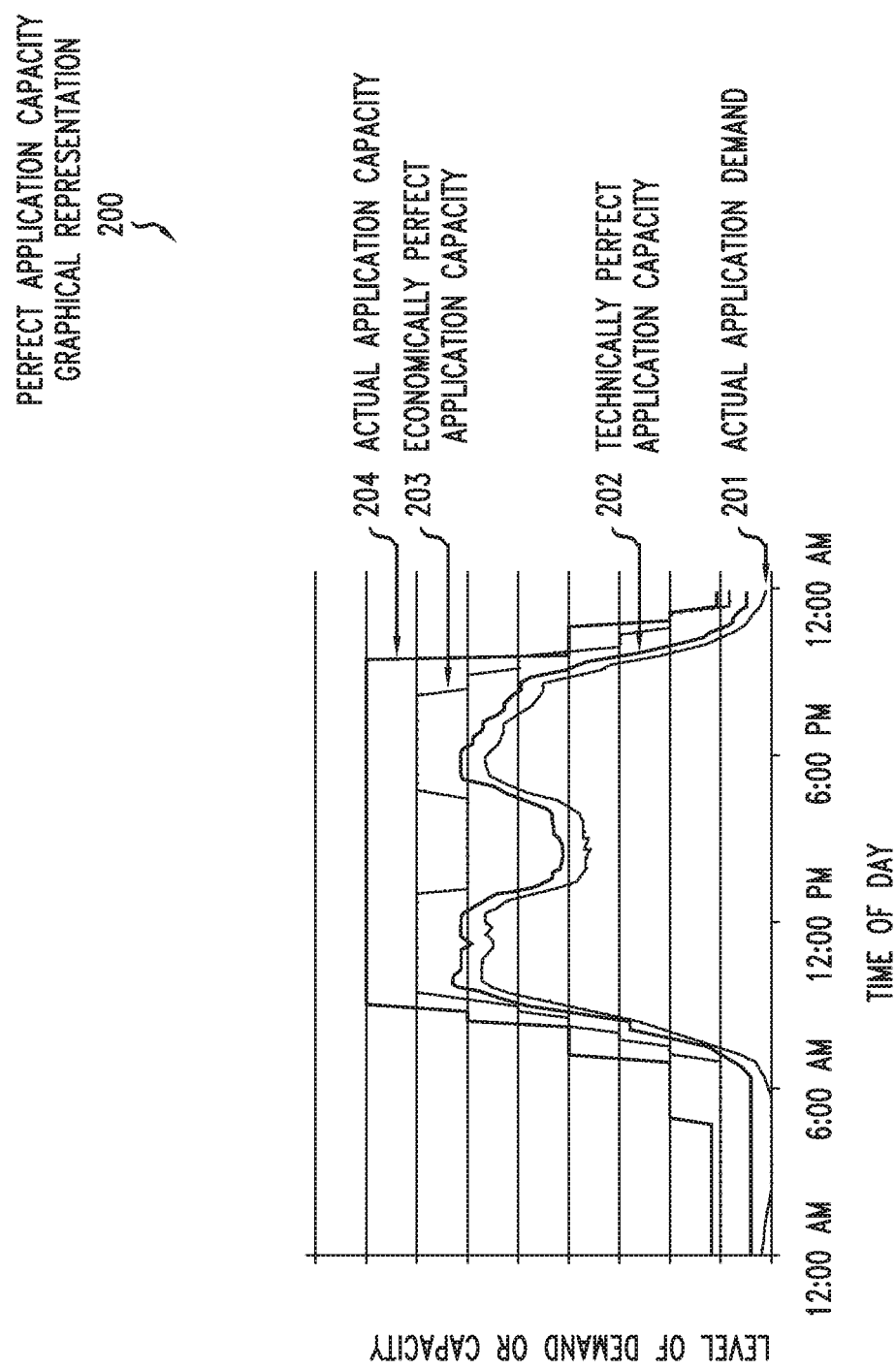
FIG. 2 depicts an exemplary graphical representation of perfect application capacity of a cloud-based application for a single day.

The management system 130 is configured to receive historical application data associated with a cloud-based application 116 being analyzed. The historical application data associated with cloud-based application 116 may include historical application demand data for the cloud-based application 116, which may be in the form of quantities of demand for the cloud-based application 116 (e.g., from cloud client 120 requesting to use the cloud-based application 116) measured over time. The historical application data associated with cloud-based application 116 may include historical application capacity data for the cloud-based application 116, which may be in the form of quantities of capacity for the cloud-based application 116 (e.g., made available for the cloud-based application 116 by the cloud computing provider in the form of virtual resources 114 of cloud computing environment 110) measured over time. The historical application data for the cloud-based application 116 that is received may be associated with one or more previous time periods occurring prior to use of the historical application data to analyze the cloud-based application 116 (e.g., an immediately preceding time period, a most recent preceding time period similar to a future time period for which management system 130 would like to improve elastic capacity management for the cloud-based application 116, or the like, as well as various combinations thereof). The historical application demand data and the historical application capacity data for the cloud-based application 116 are associated with each other in the sense that the historical application capacity data is indicative of application capacity available in the cloud computing environment 110 for the cloud-based application 116 (e.g., VMs online and active for the cloud-based application 116) when the cloud-based application 116 experienced the application demand indicated by the historical application demand data (e.g., from cloud clients 120 using the cloud-based application 116). The historical application data for the cloud-based application 116 may be received from local memory of management system 130, from one or more other management systems associated with cloud computing environment 110, from one or more performance management data repositories, or the like, as well as various combinations thereof. It is noted that exemplary graphical representations of historical application demand data and historical application capacity data for a cloud-based application 116 are depicted in FIG. 2.

The management system 130 is configured to determine constraints associated with the cloud-based application 116. The constraints associated with the cloud-based application 116 may include constraints which constraint allocation of application capacity (e.g., elements 117) for the cloud-based application 116. The constraints associated with the cloud-based application 116 may include one or more sets of constraints for use in determining one or more sets of perfect application capacity data for the cloud-based application 116 as discussed further below. It will be appreciated that one or more types of constraints may be included within a set of constraints for use in determining a set of perfect application capacity data depending on the type of perfect application capacity analysis to be performed and, similarly, depending on the type of perfect application capacity data to be determined (e.g., using one set of constraints for economically perfect application capacity data, using another set of constraints for technically perfect application capacity data, or the like). The constraints may include one or more of operational constraints, process constraints, policy constraints, architectural constraints, or the like, as well as various combinations thereof. For example, operational constraints for a cloud-based application 116 may include a reserve capacity constraint of the application service provider that is indicative of a minimum amount of application capacity which must be maintained online for the cloud-based application 116, a constraint on the cadence of capacity management decisions for the cloud-based application 116 (e.g., every 30 minutes, every hour, every 2 hours, or the like), or the like. For example, process constraints for a cloud-based application 116 may include one or more of a reserve capacity requirement (e.g., a quantity of spare capacity held for contingencies), a capacity fulfillment time (e.g., the length of time required for a fulfillment action to be completed), overload control or grade of service, forecasting accuracy (e.g., if demand forecasts are more accurate there is less uncertainty and, thus, processes can run tighter), capacity plan evaluation cadence, elastic capacity change size, or the like, as well as various combinations thereof. For example, policy constraints may include a policy limiting the maximum number of capacity change actions within a given time period (e.g., per day, hour, minute, or the like), a policy limiting the number of simultaneously pending capacity change actions, a demand management policy (e.g., a policy not to overbook capacity, a policy to overbook capacity under certain conditions (e.g., where it may be economically optimal for the server to provide a "no capacity available" message than to serve certain extreme spikes in application demand), or the like), or the like, as well as various combinations thereof. For example, architectural constraints may include a constraint on the smallest technically feasible unit of application capacity change or other suitable architectural constraint(s). The constraints associated with the cloud-based application 116 may include various other constraints which may be used for determining one or more sets of perfect application capacity data for the cloud-based application 116.

The management system 130 is configured to determine perfect application capacity data for the cloud-based application 116. The capacity data for the cloud-based application 116 may be determined based on the historical application demand data for the cloud-based application 116 and the constraints associated with the cloud-based application 116. The perfect application capacity data for the cloud-based application 116 may be determined based on the historical application demand data for the cloud-based application 116 and the constraints associated with the cloud-based application 116. The perfect application capacity data for the cloud-based application 116 may be determined based on the historical application demand data for the cloud-based application 116 and the constraints associated with the cloud-based application 116 by determining a minimum amount of application capacity that could have been made available to serve the actual application demand of the cloud-based application 116, subject to one or more constraints associated with the cloud-based application 116. The perfect application capacity data for the cloud-based application 116 may include one or more sets of perfect application capacity data which may be determined based on one or more sets of constraints associated with operation of the cloud-based application 116. In general, different sets of perfect application capacity data may be determined for the cloud-based application 116 by varying values or settings of one or more constraints in a given set of constraints used for determining the perfect application capacity data for the cloud-based application 116, varying one or more constraints in sets of constraints used for determining the perfect application capacity data for the cloud-based application, or the like, as well as various combinations thereof. For example, multiple sets of perfect application capacity data may be determined for the cloud-based application 116 based on a particular constraint or set of constraints (e.g., based on a reserve capacity constraint of the application service provider that is indicative of a minimum amount of application capacity which must be maintained online for the cloud-based application 116, based on a combination of a constraint on the cadence of capacity management decisions for the cloud-based application 116 and a policy limiting the maximum number of capacity change actions within a given time period, or the like) by using multiple different values for the particular constraint or set of constraints (e.g., using two different values of the reserve capacity constraint to determine two different sets of perfect application capacity data, using a first value of a capacity management decision cadence and a first value of a maximum number of capacity change actions to determine a first set of perfect application capacity data and using the first value of the capacity management decision cadence and a second value of the maximum number of capacity change actions to determine a second set of perfect application capacity data, using a first value of a capacity management decision cadence and a first value of a maximum number of capacity change actions to determine a first set of perfect application capacity data and using a second value of the capacity management decision cadence and a second value of the maximum number of capacity change actions to determine a second set of perfect application capacity data, or the like). For example, multiple sets of perfect application capacity data may be determined for the cloud-based application 116 based on multiple sets of constraints (e.g., determining a first set of perfect application capacity data based on a reserve capacity constraint of the application service provider that is indicative of a minimum amount of application capacity which must be maintained online for the cloud-based application 116, determining a second set of perfect application capacity data based on a combination of a constraint on the cadence of capacity management decisions for the cloud-based application 116 and a policy limiting the maximum number of capacity change actions within a given time period, or the like). For example, multiple sets of perfect application capacity data may be determined for the cloud-based application 116 based on multiple sets of constraint types (e.g., determining a first set of perfect application capacity data while being constrained by operational constraints and policy constraints, determining a second set of perfect application capacity data while being constrained by operational constraints but without being constrained by policy constraints, or the like). It is noted that various combinations of such embodiments may be used to test various "what if" scenarios (e.g., how much application capacity waste can be eliminated if we accelerate our capacity management cadence from evaluating every 30 minutes to evaluating every 5 minutes, how much application capacity waste can be eliminated if we change from only permitting 5 simultaneous application capacity change actions to permitting 7 simultaneous, or the like, as well as various combinations thereof). It is further noted that various combinations of such embodiments may be used to evaluate alternative constraint options being considered for implementation by the application service provider (e.g., alternative operational constraints, alternative process constraints, alternative policy constraints, alternative architectural constraints, or the like, as well as various combinations thereof). It is noted that various combinations of such embodiments may be used in order to determine various sets of perfect application capacity data for a cloud-based application 116 that may be used to identify various types of opportunities for improvement of elastic capacity management for the cloud-based application 116; however, for purposes of clarity, use of perfect application capacity data to identify opportunities for improvement of elastic capacity management of a cloud-based application 116 is primarily depicted and described herein with respect to use of two specific types of perfect application capacity data for the cloud-based application 116 (namely, economically perfect application capacity data and technically perfect application capacity data). The concepts of economically perfect application capacity and technically perfect application capacity are discussed further below, and may be further understood by first considering perfect application capacity more generally.

In general, perfect application capacity for a cloud-based application may be defined as a minimum amount of application capacity that could have been made available for the cloud-based application 116 in order to serve the actual application demand of the cloud-based application 116 with acceptable quality of service, subject to one or more constraints. The perfect application capacity for a cloud-based application 116 may be considered to represent the optimum amount of application capacity (e.g., the minimum number of elements 117, such as application components, application instances, or the like) that would have been provided for the cloud-based application 116 in order to meet the actual application demand that was experienced by the cloud-based application 116 if the actual application demand that was experienced by the cloud-based application 116 was known in advance (e.g., comparing what was actually done to provide application capacity for the cloud-based application 116 to what should have been done to provide application capacity for the cloud-based application 116 given knowledge of the actual application demand that was experienced by the cloud-based application 116). In other words, perfect application capacity analysis may be considered to be hindsight-type analysis for determining how, and by how much, the application service provider could have done better in providing application capacity for the cloud-based application 116 (e.g., identifying excess online application capacity of the cloud-based application 116 that could have been eliminated while still satisfying the constraints considered in the perfect application capacity analysis). As discussed herein, perfect application capacity for a cloud-based application 116 may be represented using perfect application capacity data for the cloud-based application 116. As indicated above and discussed further below, various types of perfect application capacity, including economically perfect application capacity and technically perfect application capacity, may be defined and, thus, various types of perfect application capacity data, including economically perfect application capacity data and technically perfect application capacity data may be computed. It is noted that perfect application capacity and perfect application capacity data may be further understood by way of reference to FIGS. 2-3.

In general, economically perfect application capacity for a cloud-based application 116 may be defined as a minimum amount of application capacity that could have been made available to serve the actual application demand of the cloud-based application 116, with acceptable quality of service and minimum excess capacity, while still being constrained by operational and policy constraints of the application service provider. The economically perfect application capacity for a cloud-based application 116 may be considered to represent the optimum amount of application capacity that would have been provided for the cloud-based application 116 in order to meet the actual application demand that was experienced by the cloud-based application 116, while also minimizing cost and conforming to operational constraints and policy constraints of the application service provider, if the actual application demand that was experienced by the cloud-based application 116 was known in advance (e.g., comparing what was actually done to provide application capacity for the cloud-based application 116 to what should have been done to provide application capacity for the cloud-based application 116 with minimum cost given knowledge of the actual application demand that was experienced by the cloud-based application 116). In other words, economically perfect application capacity analysis may be considered to be hindsight-type analysis for determining how the application service provider could have done better (and by how much the application service provider could have done better) in providing application capacity for the cloud-based application 116 with minimum cost to the application service provider while still conforming to the operations and policies of the application service provider. It will be appreciated that use of the term "cost" here may refer to monetary cost or other types of cost to the application service provider, such as cost in terms of wasted resources, cost in terms of wasted work or effort, or the like, as well as various combinations thereof. It is noted that economically perfect application capacity may be further understood by way of reference to FIGS. 2-3.

In general, technically perfect application capacity for a cloud-based application 116 may be defined as a minimum amount of application capacity that could have been made available to serve the actual application demand of the cloud-based application 116, with minimum cost and acceptable quality of service, while still being constrained by policy constraints of the application service provider but without being constrained by operational constraints of the application service provider. The technically perfect application capacity for a cloud-based application 116 may be considered to represent the optimum amount of application capacity that would have been provided for the cloud-based application 116 in order to meet the actual application demand that was experienced by the cloud-based application 116, while also minimizing cost and conforming to policies of the application service provider but without being constrained by operational constraints of the application service provider, if the actual application demand that was experienced by the cloud-based application 116 was known in advance (e.g., comparing what was actually done to provide application capacity for the cloud-based application 116 to what should have been done to provide application capacity for the cloud-based application 116 with minimum cost given knowledge of the actual application demand that was experienced by the cloud-based application 116). In other words, technically perfect application capacity analysis may be considered to be hindsight-type analysis for determining how the application service provider could have done better (and by how much the application service provider could have done better) in providing application capacity for the cloud-based application 116 with minimum cost to the application service provider while still conforming to the policy constraints of the application service provider but without being constrained by the operational constraints of the application service provider. It will be appreciated that use of the term "cost" here may refer to monetary cost or other types of cost to the application service provider, such as cost in terms of wasted resources, cost in terms of wasted work or effort, or the like, as well as various combinations thereof. It is noted that technically perfect application capacity may be further understood by way of reference to FIGS. 2-3.

As discussed above, economically perfect application capacity and technically perfect application capacity for a cloud-based application 116 may be defined as a minimum amount of application capacity that could have been made available to serve the actual application demand of the cloud-based application 116 with minimum cost; however, a difference between economically perfect application capacity and technically perfect application capacity is that economically perfect application capacity is still constrained by both the operational constraints and policy constraints of the application service provider, whereas technically perfect application capacity is only constrained by the policy constraints of the application service provider but is not constrained by the operational constraints of the application service provider. As a result, it is expected that, for a given cloud-based application 116, the quantity of the economically perfect application capacity of the cloud-based application 116 will be greater than the quantity of the technically perfect application capacity of the cloud-based application 116 at any given time (e.g., since the larger set of constraints for the economically perfect application capacity of the cloud-based application 116 will result in additional application capacity being made available for the cloud-based application 116, even though technical mechanisms for control over the application capacity of the cloud-based application 116 could have further reduced the amount of application capacity made available to support application demand for the cloud-based application (albeit at a higher cost)). The operational constraints governing economically perfect application capacity may include a minimum size of capacity change actions (e.g., never change capacity by less than capacity to serve X active application users), a maximum rate of capacity change actions (e.g., less than or equal to Y capacity change actions within a time period T), a maximum number of pending capacity change actions (e.g., less than or equal to Y capacity change actions pending at any given instant of time t), or the like. For example, an application service provider may have an operational constraint that it will not make application capacity changes of less than capacity to server 1000 active users at a time, even though the application is technically capable of making capacity changes for every 100 active users, because growing and shrinking application capacity by blocks of 1000 active users is expected to happen far less frequently and, thus, reduces the operational overhead/complexity incurred by the application service provider (albeit at the cost of wasting additional resources). For example, an application service provider may have an operational constraint that no more than 10 capacity change actions may be performed per hour, even though the application is technically capable of making more than 10 capacity changes per hour, because growing and shrinking application capacity less often reduces the operational overhead/complexity incurred by the application service provider (albeit at the cost of wasting additional resources). For example, an application service provider may have an operational constraint that no more than 3 capacity change actions may be pending at any given instant of time, even though the application is technically capable of making more than 3 capacity changes at a time, because growing and shrinking application capacity less often reduces the operational overhead/complexity incurred by the application service provider (albeit at the cost of wasting additional resources). It will be appreciated that few or more, including various other, operational constraints of the application service provider may be considered in determining economically perfect application capacity for a cloud-based application 116. It is noted that, while one can technically imagine doing huge numbers of tiny capacity changes, the amount of risk and overhead (e.g., complexity, costs of ordering and managing a large number of individual transactions, or the like) to which the application service provider is exposed increases when capacity changes are performed in this manner, such that it may be more beneficial for the application service provider to operationally constrain elastic capacity management even though this may result in a waste of resources (as illustrated, the economically perfect application capacity is generally greater than the technically perfect application capacity since further reductions in application capacity based on technical mechanisms is expected to be at the expense of greater cost to the application service provider).

The management system 130 may be configured to provide a representation of perfect application capacity data determined for the cloud-based application 116. The perfect application capacity data determined for the cloud-based application 116 may be represented in various ways.

For example, perfect application capacity data determined for the cloud-based application 116 may be represented using text-based data. For example, perfect application capacity data determined for the cloud-based application 116 may be represented using one or more quantitative measures of perfect application capacity, one or more text-based descriptions of perfect application capacity, a text-based expression of an optimal set of capacity change actions to minimize application capacity subject to constraints, or the like, as well as various combinations thereof. For example, perfect application capacity data determined for the cloud-based application 116 may be represented as one or more application capacity plans for issuing application capacity change orders (e.g., one or more application capacity plans indicating one or more of whether the application capacity of the cloud-based application 116 is to be increased or decreased, by how much the application capacity of the cloud-based application 116 is to be increased or decreased, application capacity placement (e.g., geographic locations for best-serving application demand from users spread across large geographic areas, locations within datacenters for best-serving application demand based on various constraints, or the like), or the like, as well as various combinations thereof).

For example, perfect application capacity data determined for the cloud-based application 116 may be represented graphically. For example, perfect application capacity data determined for the cloud-based application 116 may be represented as a set of one or more perfect application capacity curves where a perfect application capacity curve may comprise a plot of a quantity of application capacity for the cloud-based application 116 over time. For example, perfect application capacity data determined for the cloud-based application 116 may be represented using data indicative of graphical representations of perfect application capacity data where such graphical representations of perfect application capacity data are not presented (e.g., (e.g., data which could be processed to present a set of perfect application capacity curves via a display interface or other suitable presentation interface). For example, perfect application capacity data determined for the cloud-based application 116 may be represented via presentation of a set of perfect application capacity curves which are generated based on data indicative of graphical representations of perfect application capacity data (e.g., examples of which are depicted in FIG. 2 for economically perfect application capacity and technically perfect application capacity as discussed further below). Accordingly, unless otherwise indicated, references herein to a perfect application capacity curve may be considered to be references to data indicative of a graphical representation of the perfect application capacity curve (again, data which could be used to generate and present the perfect application capacity curve) or a presentation of a graphical representation of the perfect application capacity curve (again, generated based on the data indicative of the graphical representation of the perfect application capacity curve). It will be appreciated that the same also may be true for other types of curves discussed herein (e.g., actual application capacity curves, actual application demand curves, or the like).

It will be appreciated that the perfect application capacity data determined for the cloud-based application 116 may be represented in other ways.

FIG. 2 depicts an exemplary graphical representation of perfect application capacity of a cloud-based application for a single day. The exemplary perfect application capacity graphical representation 200 is provided in the form of a graph in which the x-axis represents a time period (in this example, time of day during a 24-hour period) and the y-axis represents the magnitude of application capacity or application demand within the time period. The curve 201 represents the actual application demand experienced by the cloud-based application 116 during the time period, and it is noted that the data indicative of the actual application demand experienced by the cloud-based application 116 during the time period may be referred to herein as actual application demand data or historical application demand data. The curve 202, which is above the curve 201, represents the technically perfect application capacity which could have been made available to meet the application demand for the cloud-based application 116 during the time period. The curve 203, which is above the curve 202, represents the economically perfect application capacity which could have been made available to meet the application demand for the cloud-based application 116 during the time period. The economically perfect application capacity is depicted as being greater than the technically perfect application capacity to reflect the fact that various factors (e.g., service provider cost structures, risk tolerances, or the like) often prevent service providers from cost-effectively achieving technically perfect application capacity at minimum cost. The curve 204, which is above the curve 203, represents the actual application capacity of the cloud-based application 116 that was made available by the application service provider to meet the actual application demand (represented by curve 201) for the cloud-based application 116, and it is noted that the data indicative of the actual application capacity that was made available for the cloud-based application 116 during the time period may be referred to herein as actual application capacity data or historical application capacity data. It will be appreciated that, while curve 204 is depicted as being above 201, curve 201 could be above curve 204 for some or all of the time period under certain conditions (e.g., where poor planning (e.g., a botched demand forecast) or some other condition (e.g., a disaster) caused actual application capacity 204 to be less than the actual application demand 201). It is noted that areas between various curves of FIG. 2 may represent opportunities to improve elastic capacity management for the cloud-based application 116.

The management system 130 is configured to identify an opportunity to improve elastic capacity management for the cloud-based application 116. The management system 130 is configured to identify an opportunity to improve elastic capacity management for the cloud-based application 116 based on the perfect application capacity data for the cloud-based application 116 and the historical application data for the cloud-based application 116.

The management system 130 may be configured to identify an opportunity to improve elastic capacity management for the cloud-based application 116 based on a comparison of the historical application capacity data for the cloud-based application 116 and the economically perfect application capacity data for the cloud-based application 116. The opportunity to improve elastic capacity management for the cloud-based application 116 that is determined based on a comparison of the historical application capacity data for the cloud-based application 116 and the economically perfect application capacity data for the cloud-based application 116 may represent an opportunity for an operational improvement which may be made to improve elastic capacity management for the cloud-based application 116.

The management system 130 may be configured to identify an opportunity to improve elastic capacity management for the cloud-based application 116 based on a comparison of the economically perfect application capacity data for the cloud-based application 116 and the technically perfect application capacity data for the cloud-based application 116. The opportunity to improve elastic capacity management for the cloud-based application 116 that is determined based on a comparison of the economically perfect application capacity data for the cloud-based application 116 and the technically perfect application capacity data for the cloud-based application 116 may represent an opportunity for a process improvement which may be made to improve elastic capacity management for the cloud-based application 116.

The management system 130 may be configured to identify an opportunity to improve elastic capacity management for the cloud-based application 116 based on a comparison of the technically perfect application capacity data for the cloud-based application 116 and historical application demand data for the cloud-based application 116. The opportunity to improve elastic capacity management for the cloud-based application 116 that is determined based on a comparison of the technically perfect application capacity data for the cloud-based application 116 and historical application demand data for the cloud-based application 116 may represent an opportunity for a policy improvement which may be made to improve elastic capacity management for the cloud-based application 116 or an architectural improvement which may be made to improve elastic capacity management for the cloud-based application 116.

The management system 130 may be configured to identify an opportunity to improve elastic capacity management for the cloud-based application 116 where the opportunity may be an opportunity to manage closer to currently defined operational policies with the existing systems and configurations, an opportunity to optimize existing operational policies, systems, and configurations to reduce waste, or the like, as well as various combinations thereof.

It will be appreciated that, although primarily depicted and described herein with respect to use of specific perfect application capacity types to identify improvements for elastic capacity management of the cloud-based application 116 (namely, economically perfect application capacity and technically perfect application capacity where these perfect application capacity types are defined in particular ways, respectively), various other types of perfect application capacity (e.g., economically perfect application capacity defined in a different way, technically perfect application capacity defined in a different way, one or more different types of perfect application capacity, or the like, as well as various combinations thereof) may be used to identify improvements for elastic capacity management of the cloud-based application 116. For example, a set of technically perfect application capacity curves may be defined for a set of cadence values (e.g., 15 minute cadence, 10 minute cadence, 5 minute cadence, and 3 minute cadence) such that the application service provider may consider the incremental costs associated with shorter cadence times against the waste reduction benefits of the shorter cadence times. For example, a set of technically perfect application capacity curved may be defined for a set of application capacity reserve requirement policies such that the application service provider may consider the incremental costs associated with different application capacity reserve requirement policies. It will be appreciated that multiple variant perfect application capacity models may be defined to enable methodical analysis (e.g., different cadence timing as discussed above, different application capacity reserve requirement policies as discussed above, different minimum capacity change increments, or the like, as well as various combinations thereof). Thus, it will be appreciated that "economically perfect application capacity" and "technically perfect application capacity" as defined here may merely be illustrative and, thus, that in at least some embodiments, various types of perfect application capacity curves may be defined and tailored in order to evaluate and realize various types of optimizations.

The management system 130 may be configured to identify various other types of opportunities to improve elastic capacity management for the cloud-based application 116 based on various other types of perfect application capacity data which may be determined for the cloud-based application 116.

Figure 3:
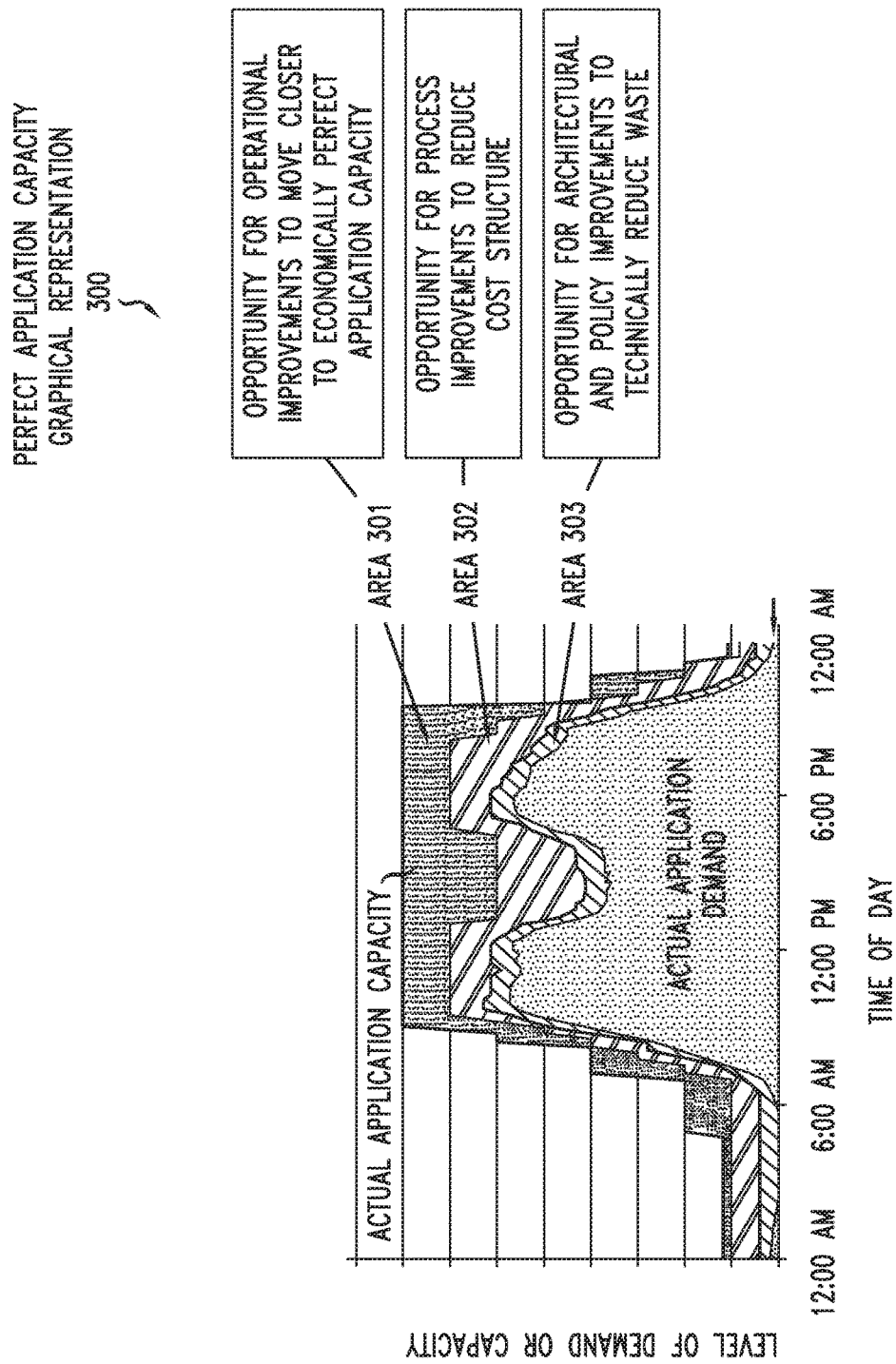
FIG. 3 depicts the exemplary graphical representation of perfect application capacity of FIG. 2, while also illustrating opportunities for elastic capacity management improvements based on perfect application capacity data.

The management system 130 may be configured to provide a representation of an opportunity to improve elastic capacity management for the cloud-based application 116. The opportunity for improvement of elastic capacity management of the cloud-based application 116 may be represented in various ways. For example, the opportunity for improvement of elastic capacity management of the cloud-based application 116 may be represented using text-based data (e.g., one or more quantitative measures of opportunity, one or more text-based descriptions of opportunity, a text-based expression of an optimal set of capacity change actions to minimize application capacity subject to constraints, or the like, as well as various combinations thereof). For example, the opportunity for improvement of elastic capacity management of the cloud-based application 116 may be represented graphically (e.g., as highlighting of area between curves that include at least one perfect application capacity curve (an example of which is depicted in FIG. 3), as a plot of a quantity of opportunity over time (e.g., determined by computing the distance between two curves over time), or the like, as well as various combinations thereof). The opportunity to improve elastic capacity management for the cloud-based application 116 may be represented in other ways.

FIG. 3 depicts the exemplary graphical representation of perfect application capacity of FIG. 2, while also illustrating opportunities for elastic capacity management improvements based on perfect application capacity data. As depicted in FIG. 3, exemplary perfect application capacity graphical representation 300 is based on exemplary perfect application capacity graphical representation 200 of FIG. 2 and, thus, is provided in the form of a graph in which the x-axis represents a time period (in this example, time of day during a 24-hour period) and the y-axis represents the application capacity or application demand within the time period. As discussed above with respect to FIG. 2, areas between various curves of the exemplary perfect application capacity graphical representation 300 of FIG. 2 represent opportunities to improve elastic capacity management for the cloud-based application 116 (e.g., by pushing actual application capacity toward actual application demand in order to support lean cloud computing and reduce resource waste).

The area 301 between actual application capacity (curve 204) and economically perfect application capacity (curve 203) represents an opportunity to move actual application capacity (curve 204) toward the economically perfect application capacity (curve 203) and, thus, closer to the actual application demand (curve 201). The opportunity associated with area 301 may be represented graphically (as depicted in FIG. 3, as a plot of a quantity of opportunity over time (e.g., determined by computing the distance between curves 204 and 203 over time), or the like) or in other ways (e.g., as a quantity by computing a value of the area between curve 204 and curve 203 for the time period, or in other suitable ways). The opportunity associated with area 301 may be indicative of one or more opportunities for operational improvements associated with providing the actual application capacity for the cloud-based application 116. For example, operational improvements which may be used to move the actual application capacity of the cloud-based application 116 closer to the economically perfect application capacity of the cloud-based application 116 may include better demand forecasting, shorter and more consistent application capacity fulfillment lead times, or the like, as well as various combinations thereof. The use of operational improvements to move actual application capacity of cloud-based application 116 closer to the economically perfect application capacity of cloud-based application is expected to result in less application capacity having to be made available to support application demand for the cloud-based application 116 and, thus, to result in lower costs for the application service provider of the cloud-based application 116.

The area 302 between economically perfect application capacity (curve 203) and technically perfect application capacity (curve 202) represents an opportunity to move economically perfect application capacity (curve 203) toward technically perfect application capacity (curve 202) and, thus, closer to the actual application demand (curve 201). The opportunity associated with area 302 may be represented graphically (as depicted in FIG. 3, as a plot of a quantity of opportunity over time (e.g., determined by computing the distance between curves 204 and 203 over time), or the like) or in other ways (e.g., as a quantity by computing a value of the area between curve 203 and curve 202 for the time period, or in other suitable ways). The opportunity associated with area 302 may be indicative of one or more opportunities for process improvements associated with providing the actual application capacity for the cloud-based application 116. For example, process improvements which may be used to move the economically perfect application capacity of the cloud-based application 116 closer to the technically perfect application capacity of the cloud-based application 116 may include improvements to application capacity management processes for the cloud-based application 116 (e.g., changing the permitted maximum number of simultaneous capacity change actions which may be performed, changing the permitted maximum number of capacity change actions which may be pending, changing the permitted rate of capacity change actions (e.g., every 5 minutes instead of every 15 minutes), changing the permitted maximum number of capacity change units for capacity growth or degrowth, or the like, as well as various combinations thereof), improvements to processes related to controlling reserve capacity requirements for the cloud-based application 116, or the like, as well as various combinations thereof. It is noted that improving processes of the cloud-based application 116 in this manner can drive down application service provider costs so that more aggressive (e.g., more frequent) capacity management actions become economically useful. It is noted that the opportunity associated with area 302 may be indicative of processes for the cloud-based application 116 that, while perhaps known, were deemed not to be economically useful since the costs to the application service provider of executing those processes outweighed the savings potentially accrued by those processes. It is noted that the opportunity associated with area 302 may be indicative of opportunities to reduce the cost structure for making application capacity available to support application demand and, therefore, could result in lower costs for the application service provider. The use of process improvements to move the economically perfect application capacity of the cloud-based application 116 closer to the technically perfect application capacity of the cloud-based application 116 is expected to result in less application capacity having to be made available to support application demand for the cloud-based application 116.

The area 303 between technically perfect application capacity (curve 202) and actual application demand (201) represents an opportunity to move technically perfect application capacity (curve 202) toward actual application demand (curve 201). The opportunity associated with area 303 may be represented graphically (as depicted in FIG. 3, as a plot of a quantity of opportunity over time (e.g., determined by computing the distance between curves 204 and 203 over time), or the like) or in other ways (e.g., as a quantity by computing a value of the area between curve 202 and curve 201 for the time period, or in other suitable ways). The opportunity associated with area 303 may be indicative of one or more opportunities for policy or architectural improvements associated with providing the actual application capacity for the cloud-based application 116. For example, policy improvements which may be used to move the technically perfect application capacity of the cloud-based application 116 closer to the actual application demand of the cloud-based application may include one or more of improvements to a reserve capacity policy of the application service provider (e.g., a policy indicative as to the quantity of spare online reserve application capacity that the application service provider has stipulated be maintained in order to mitigate various conditions which may require additional application capacity (e.g., un-forecasted surges in application demand, failures, or the like)), improvements to a capacity planning and decision cadence policy of the application service provider (e.g., a policy indicative of the frequency with which the application service provider performs real time evaluations of online application capacity, which may be influenced by the cadence of performance measurement), or the like, as well as various combinations thereof. For example, architectural improvements which may be used to move the technically perfect application capacity of the cloud-based application 116 closer to the actual application demand of the cloud-based application may include one or more of improvements to application capacity fulfillment actions (e.g., quantity, latency, or the like), improvements to timeliness and accuracy of performance data that is used in capacity planning and decision making, or the like, as well as various combinations thereof. It is noted that at least some policies may be influenced by a range of architectural factors. The use of policy improvements or architectural improvements to move the technically perfect application capacity of the cloud-based application 116 closer to the actual application demand of the cloud-based application 116 is expected to result in less application capacity having to be made available to support the application demand for the cloud-based application 116.

It will be appreciated that, although primarily depicted and described herein with respect to graphical representations of perfect application capacity that include specific data arranged in a specific arrangement (e.g., exemplary perfect application capacity graphical representation 200 of FIG. 2 and exemplary perfect application capacity graphical representation 300 of FIG. 3), graphical representations of perfect application capacity may include more or less (and potentially other types of) data (e.g., only one or the other of an economically perfect application capacity curve or a technically perfect application capacity curve, one or more additional types of perfect application capacity curves, values for quantifying opportunities, or the like, as well as various combinations thereof), may include other arrangements of data (e.g., using fewer or more graphs, using other mechanisms for highlighting areas between perfect application capacity curves, or the like, as well as various combinations thereof), or the like, as well as various combinations thereof.

It is noted that, although primarily depicted and described with respect to embodiments of in which perfect application capacity analysis is used to identify opportunities for improvement of elastic capacity management of the cloud-based application 116 when the actual application capacity (curve 204) of the cloud-based application is above the actual application demand (curve 201) of the cloud-based application 116, in at least some embodiments perfect application capacity analysis is used to identify opportunities for improvement of elastic capacity management of the cloud-based application 116 when the actual application capacity (curve 204) of the cloud-based application is below the actual application demand (curve 201) of the cloud-based application 116 for all or part of the time period in question (thereby resulting in one or more "negative" gaps defined based on perfect application curves). In at least some such embodiments, closing the "negative" gaps defined based on perfect application curves may represent one or more of an opportunity to reduce risk (e.g., because the cloud-based application 116 has less reserve application capacity online for a time than policy stipulates), an opportunity to improve service quality if actual application demand actually outstripped actual application capacity, or the like, as well as various combinations thereof. It is noted that, technically, failing to serve application demand is waste in the form of unmet demand, loss of customer good will, potential penalties or service level agreement (SLA) liabilities, loss of revenue, and so forth.

The management system 130 may be configured to perform the above-described functions, for perfect application capacity analysis for improving elastic capacity management of a cloud-based application 116, using time periods. For example, historical application capacity data associated with one or more previous time periods may be used to determine perfect application capacity data for the one or more previous time periods in order to identify and implement one or more improvements for the cloud-based application in a current time period, one or more future time periods, or the like, as well as various combinations thereof. It will be appreciated that the time period may be any suitable length of time (e.g., one day, one week, or the like) and that the length of the time period may change over time.

The management system 130 may be configured to repeat the above-described functions, for perfect application capacity analysis for improving elastic capacity management of a cloud-based application 116, over time for driving (or at least attempting to drive) the actual application capacity of cloud-based application 116 toward the actual application demand of the cloud-based application 116. The driving of the actual application capacity of the cloud-based application toward the actual application demand of the cloud-based application is expected to result in reductions in, and possibility minimization of, costs to the application service provider of cloud-based application 116.

The management system 130 may be configured to analyze an opportunity to improve elastic capacity management for the cloud-based application 116 in order to identify one or more improvements for elastic capacity management of the cloud-based application 116 (e.g., one or more operational improvements, one or more process improvements, one or more policy improvements, one or more architectural improvements, or the like, as well as various combinations thereof).

The management system 130 may be configured to propagate various types of information for the cloud-based application 116 toward end users associated with management of the cloud-based application 116. For example, management system 130 may be configured to propagate perfect application capacity data (e.g., graphical representations as depicted in FIGS. 2 and 3, text-based representations, or the like), improvements for elastic capacity management of the cloud-based application 116 identified based on analysis of opportunities to improve elastic capacity management for the cloud-based application 116, or the like, as well as various combinations thereof. For example, management system 130 may be configured to propagate information for the cloud-based application 116 toward end users associated with management of the cloud-based application 116 by propagating the information toward one or more terminals for display via the one or more terminals (e.g., to one or more workstations in a cloud infrastructure operations center housing end users performing management functions for the cloud infrastructure 110, to one or more mobile devices of end users performing management functions for the cloud infrastructure 110, or the like, as well as various combinations thereof).

The management system 130 may be configured to provide various other functions related to use of the concept of perfect application capacity in conjunction with efforts to improve the elastic capacity management of a cloud-based application 116.

Figure 4:
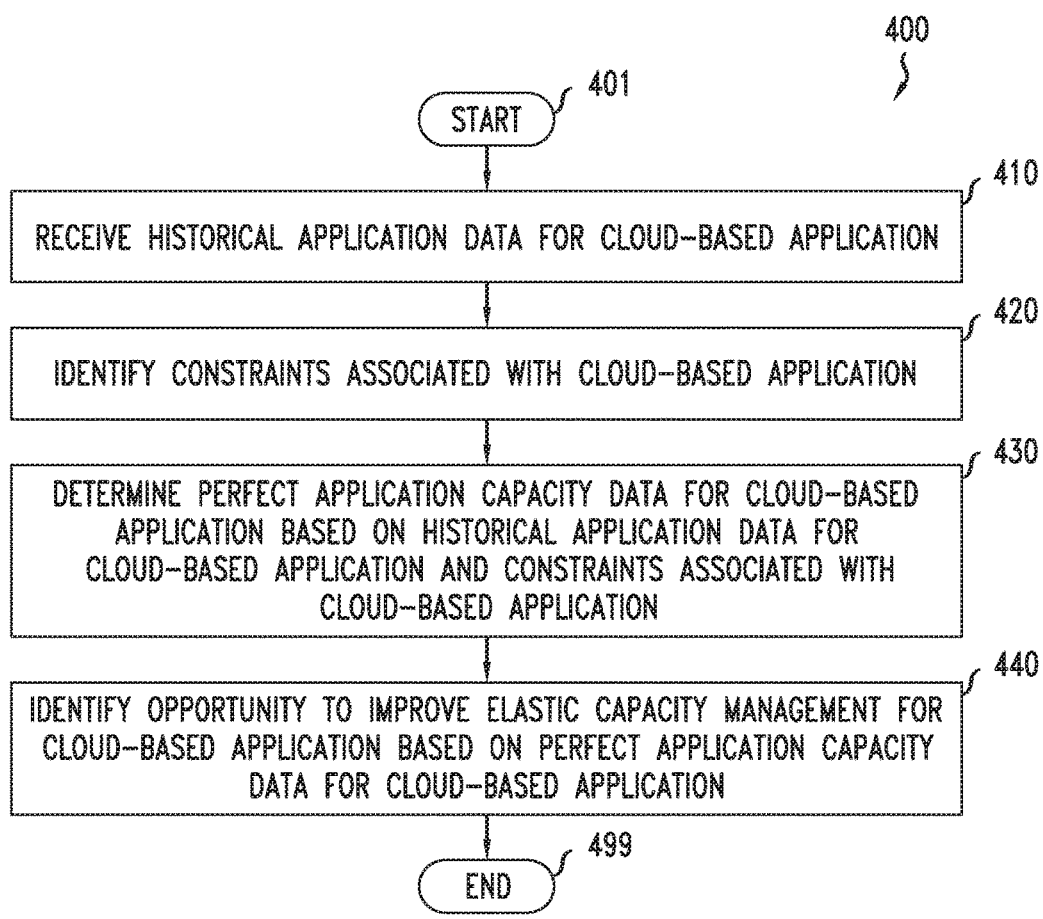
FIG. 4 depicts an exemplary embodiment of a method for determining perfect application capacity data for a cloud-based application and using the perfect application capacity data for the cloud-based application to identify opportunities for improving elastic capacity management for the cloud-based application.

FIG. 4 depicts an exemplary embodiment of a method for determining perfect application capacity data for a cloud-based application and using the perfect application capacity data for the cloud-based application to identify opportunities for improving elastic capacity management for the cloud-based application. It will be appreciated that, although presented herein as being performed serially, at least a portion of the steps of method 400 may be performed contemporaneously or in a different order than as presented in FIG. 4. It also will be appreciated that a portion of the steps of method 400 may be omitted or that method 400 may include additional steps (e.g., for providing other methods corresponding to various embodiments depicted and described with respect to FIGS. 1-3).

At step 401, method 400 begins.

At step 410, historical application data for the cloud-based application is received. The historical application data for the cloud-based application may include historical application demand data for the cloud-based application and historical application capacity data for the cloud-based application.

At step 420, constraints associated with the cloud-based application are identified. The constraints associated with the cloud-based application may include constraints which constraint allocation of application capacity for the cloud-based application. The constraints associated with the cloud-based application may include one or more sets of constraints to be applied for determining one or more sets of perfect application capacity data for the cloud-based application, respectively. The constraints may include one or more of one or more operational constraints of the cloud-based application, one or more process constraints of the cloud-based application, one or more policy constraints of the cloud-based application, one or more architectural constraints of the cloud-based application, or the like, as well as various combinations thereof.

At step 430, perfect application capacity data for the cloud-based application is determined based on the historical application data for the cloud-based application and the constraints associated with the cloud-based application. The perfect application capacity data for the cloud-based application is determined based on the historical application demand data for the cloud-based application and the constraints associated with the cloud-based application. The perfect application capacity data for the cloud-based application may include one or more sets of perfect application capacity data determined based on the historical application demand data for the cloud-based application and the one or more sets of constraints associated with the cloud-based application, respectively. It will be appreciated that, although primarily depicted and described herein with respect to two sets of perfect application capacity data (namely, one set of economically perfect application capacity data and one set of technically perfect application capacity data), fewer or more sets of perfect application capacity data may be determined based on the historical application demand data for the cloud-based application. The perfect application capacity data may be represented using a text-based representation, a graphical representation (or data which may be used to generate a graphical representation), or the like, as well as various combinations thereof.

At step 440, an opportunity to improve elastic capacity management for the cloud-based application is identified based on the perfect application capacity data for the cloud-based application. The opportunity to improve elastic capacity management for the cloud-based application may be identified based on the historical application data for the cloud-based application and the perfect application capacity data for the cloud-based application (e.g., comparisons between historical application capacity data and perfect application capacity data, comparisons between perfect application capacity data and historical application demand data, or the like, as well as various combinations thereof). The opportunity to improve elastic capacity management for the cloud-based application may be identified based on perfect application capacity data for the cloud-based application but not historical application data (e.g., comparisons between types of perfect application capacity data, such as between economically perfect application capacity data for the cloud-based application and technically perfect application capacity data for the cloud-based application). The opportunity to improve elastic capacity management for the cloud-based application may be represented using a text-based representation, a graphical representation (or data which may be used to generate a graphical representation), or the like, as well as various combinations thereof. The opportunity to improve elastic capacity management for the cloud-based application may include an opportunity for an operational improvement, an opportunity for a process improvement, an opportunity for a policy improvement, an opportunity for an architectural improvement, or the like, as well as various combinations thereof.

At step 499, method 400 ends.

It will be appreciated that the steps of method 400 of FIG. 4, as well as variations of method 400 of FIG. 4, may be further understood when read in conjunction with the description of FIGS. 1-3.

It will be appreciated that, although primarily depicted and described with respect to embodiments in which perfect application capacity analysis is performed for a single cloud-based application of a cloud computing system, in at least some embodiments perfect application capacity analysis may be performed for a set of multiple cloud-based applications (e.g., multiple cloud-based applications of the same customer, multiple cloud-based applications of the same or similar application type for one or more customers, for all cloud-based applications active during a particular time period or set of time periods, or the like, as well as various combinations thereof).

Figure 5:
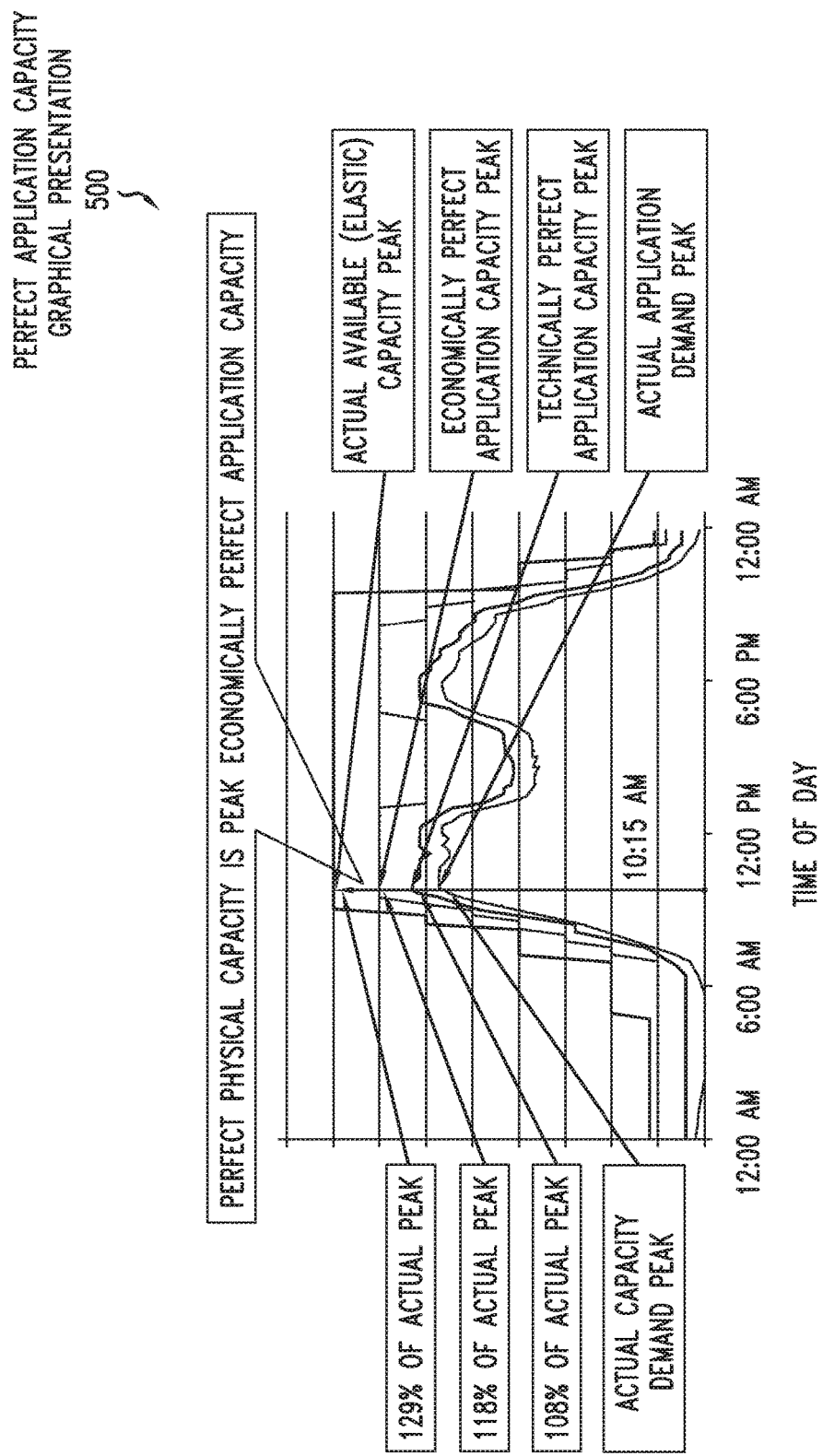
FIG. 5 depicts the exemplary graphical representation of perfect application capacity of FIG. 2, while also illustrating opportunities for physical capacity improvements based on peak application capacity data.

It will be appreciated that, although primarily depicted and described with respect to embodiments in which perfect application capacity analysis is performed for a cloud-based application in order to evaluate (and potentially improve or optimize) the available capacity for the cloud-based application, various embodiments of perfect application capacity analysis may be used to evaluate (and potentially improve or optimize) the available capacity of physical resources which support cloud-based applications (e.g., the amount of physical capacity-supporting equipment that is powered on at any point, the amount of physical capacity-supporting equipment that is deployed, or the like, as well as various combinations thereof. An exemplary use of perfect application capacity analysis to evaluate (and potentially improve or optimize) the available capacity of physical resources which support cloud-based applications 116 is depicted in FIG. 5. FIG. 5 depicts the exemplary graphical representation of perfect application capacity of FIG. 2, while also illustrating opportunities for physical capacity improvements based on peak application capacity information. As depicted in FIG. 5, exemplary perfect application capacity graphical representation 500 is based on exemplary perfect application capacity graphical representation 200 of FIG. 2 and, thus, is provided in the form of a graphical representation of capacity data using a graph in which the x-axis represents a time period (in this example, time of day during a 24-hour period) and the y-axis represents the magnitude of capacity within the time period (namely, available application capacity or application demand). As indicated above, peak capacity information of the exemplary perfect application capacity graphical representation 200 of FIG. 2 may be used to identify opportunities for capacity management improvement as depicted with respect to the exemplary perfect application capacity graphical representation 500 of FIG. 5. As depicted in FIG. 5, the peak of actual application demand was at 10:15 AM, the peak of technically perfect application capacity was 8% greater than the peak of actual application demand, the peak of economically perfect application capacity was 18% greater than the peak of actual application demand, and the peak of actual application capacity was 29% greater than the peak of actual application demand. As discussed above, peak values as depicted in FIG. 5 may be used to identify opportunities for physical capacity improvements for the physical resources 112 upon which the cloud-based applications 116 are running.

Figure 6:
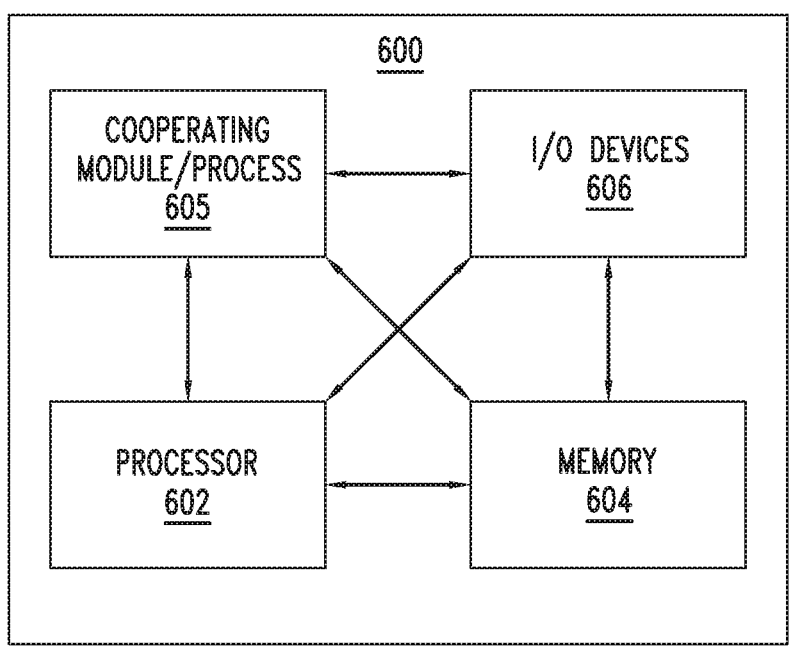
FIG. 6 depicts a high-level block diagram of a computer suitable for use in performing functions presented herein.

FIG. 6 depicts a high-level block diagram of a computer suitable for use in performing functions described herein.

The computer 600 includes a processor 602 (e.g., a central processing unit (CPU) or other suitable processor(s)) and a memory 604 (e.g., random access memory (RAM), read only memory (ROM), or the like).

The computer 600 also may include a cooperating module/process 605. The cooperating process 605 can be loaded into memory 604 and executed by the processor 602 to implement functions as discussed herein and, thus, cooperating process 605 (including associated data structures) can be stored on a computer readable storage medium (e.g., RAM memory, magnetic or optical drive or diskette, or the like).

The computer 600 also may include one or more input/output devices 606 (e.g., a user input device (such as a keyboard, a keypad, a mouse, or the like), a user output device (such as a display, a speaker, or the like), an input port, an output port, a receiver, a transmitter, a transceiver, a networking device, one or more storage devices (e.g., a tape drive, a floppy drive, a hard disk drive, a compact disk drive, or the like), or the like, as well as various combinations thereof). It will be appreciated that computer 600 depicted in FIG. 6 provides a general architecture and functionality suitable for implementing functional elements described herein and/or portions of functional elements described herein. For example, computer 600 provides a general architecture and functionality suitable for implementing one or more of an element of cloud computing environment 110, a cloud client 120, a portion of a cloud client 120, management system 130, a portion of management system 130, or the like.

It will be appreciated that the functions depicted and described herein may be implemented in software (e.g., via implementation of software on one or more processors, for executing on a general purpose computer (e.g., via execution by one or more processors) so as to implement a special purpose computer, or the like) and/or may be implemented in hardware (e.g., using a general purpose computer, one or more application specific integrated circuits (ASIC), or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
receive historical application data for a cloud-based application, wherein the historical application data comprises historical application demand data for the cloud-based application and historical application capacity data for the cloud-based application;
determine a set of constraints associated with the cloud-based application;
determine perfect application capacity data for the cloud-based application based on the historical application demand data for the cloud-based application and the set of constraints associated with the cloud-based application, wherein the perfect application capacity data comprises at least one of economically perfect application capacity data for the cloud-based application or technically perfect application capacity data for the cloud-based application; and
identify, based on at least a portion of the perfect application capacity data for the cloud-based application and at least one of the historical application demand data for the cloud-based application or the historical application capacity data for the cloud-based application, an opportunity to improve elastic capacity management for the cloud-based application.

2. The apparatus of claim 1, wherein the set of constraints associated with the cloud-based application comprises at least one of an operational constraint, a process constraint, a policy constraint, or an architectural constraint.

3. The apparatus of claim 1, wherein the set of constraints associated with the cloud-based application comprises at least one of a minimum size of capacity change actions, a maximum rate of capacity change actions, a maximum number of pending capacity change actions, or a demand forecasting policy.

4. The apparatus of claim 1, wherein, to determine the perfect application capacity data for the cloud-based application, the processor is configured to:
determine a minimum amount of application capacity for the cloud-based application, to support the historical application demand data for the cloud-based application, subject to one or more constraints of the set of constraints associated with the cloud-based application.

5. The apparatus of claim 1, wherein, to determine the perfect application capacity data for the cloud-based application, the processor is configured to:

determine a first set of perfect application capacity data for the cloud-based application based on a first set of constraints from the set of constraints associated with the cloud-based application; and determine a second set of perfect application capacity data for the cloud-based application based on a second set of constraints from the set of constraints associated with the cloud-based application;

wherein the first set of constraints and the second set of constraints are different.

6. The apparatus of claim 1, wherein, to determine the perfect application capacity data for the cloud-based application, the processor is configured to:

determine a perfect application capacity curve comprising a plot of a quantity of application capacity for the cloud-based application over time.

7. The apparatus of claim 6, wherein, to identify the opportunity to improve elastic capacity management for the cloud-based application, the processor is configured to:

determine, based on the historical application capacity data for the cloud-based application, an actual application capacity curve comprising a plot of a quantity of application capacity for the cloud-based application over time; and identify an area between the actual application capacity curve and the perfect application capacity curve.

8. The apparatus of claim 6, wherein, to identify the opportunity to improve elastic capacity management for the cloud-based application, the processor is configured to:

determine, based on the historical application demand data for the cloud-based application, an actual application demand curve comprising a plot of a quantity of application demand for the cloud-based application over time; and identify the opportunity to improve elastic capacity management for the cloud-based application based on an area between the actual application demand curve and the perfect application capacity curve.

9. The apparatus of claim 1, wherein, to determine the perfect application capacity data for the cloud-based application, the processor is configured to:

determine a set of capacity change actions for the cloud-based application.

10. The apparatus of claim 9, wherein, to identify the opportunity to improve elastic capacity management for the cloud-based application, the processor is configured to:

determine a capacity management plan for the cloud-based application based on the set of capacity change actions for the cloud-based application.

11. The apparatus of claim 1, wherein, to determine the perfect application capacity data for the cloud-based application, the processor is configured to:

determine a first set of perfect application capacity data for the cloud-based application; and determine a second set of perfect application capacity data for the cloud-based application.

12. The apparatus of claim 11, wherein the first set of perfect application capacity data for the cloud-based application comprises a first perfect application capacity curve comprising a plot of a quantity of application capacity for the cloud-based application over time, wherein the second set of perfect application capacity data for the cloud-based application comprises a second perfect application capacity curve comprising a plot of a quantity of application capacity for the cloud-based application over time.

13. The apparatus of claim 12, wherein, to identify the opportunity to improve elastic capacity management for the cloud-based application, the processor is configured to:

identify the opportunity to improve elastic capacity management for the cloud-based application based on an area between the first perfect application capacity curve and the second perfect application capacity curve.

14. The apparatus of claim 11, wherein the first set of perfect application capacity data for the cloud-based application comprises a first set of capacity change actions for the cloud-based application, wherein the second set of perfect application capacity data for the cloud-based application comprises a second set of capacity change actions for the cloud-based application.

15. The apparatus of claim 14, wherein, to identify the opportunity to improve elastic capacity management for the cloud-based application, the processor is configured to:

identify the opportunity to improve elastic capacity management for the cloud-based application, based on the first set of capacity change actions for the cloud-based application and the second set of capacity change actions for the cloud-based application, as an optimal set of capacity change actions for the cloud-based application.

16. The apparatus of claim 1, wherein, to determine the perfect application capacity data for the cloud-based application, the processor is configured to:

determine the economically perfect application capacity data for the cloud-based application while being constrained by at least one operational constraint of the cloud based application and at least one policy constraint of the cloud-based application; and determine the technically perfect application capacity data for the cloud-based application while being constrained by the at least one operational constraint of the cloud-based application but without being constrained by the at least one policy constraint of the cloud-based application.

17. The apparatus of claim 16, wherein, to identify the opportunity to improve elastic capacity management for the cloud-based application, the processor is configured to:

identify the opportunity to improve elastic capacity management for the cloud based application based on the historical application capacity data and the economically perfect application capacity data;

wherein the opportunity to improve elastic capacity management for the cloud-based application is indicative of an opportunity for an operational improvement for the cloud-based application.

18. The apparatus of claim 16, wherein, to identify the opportunity to improve elastic capacity management for the cloud-based application, the processor is configured to:

identify the opportunity to improve elastic capacity management for the cloud-based application based on the economically perfect application capacity data and the technically perfect application capacity data;

wherein the opportunity to improve elastic capacity management for the cloud-based application is indicative of an opportunity for a process improvement for the cloud-based application.

19. The apparatus of claim 16, wherein, to identify the opportunity to improve elastic capacity management for the cloud-based application, the processor is configured to:

identify the opportunity to improve elastic capacity management for the cloud-based application based on the technically perfect application capacity data and the historical application demand data;

wherein the opportunity to improve elastic capacity management for the cloud-based application is indicative of at least one of an opportunity for a policy improvement for the cloud-based application or an opportunity for an architectural improvement for the cloud-based application.

20. A non-transitory computer-readable storage medium storing instructions which, when executed by a computer, cause the computer to perform a method, the method comprising:

receiving historical application data for a cloud-based application, wherein the historical application data comprises historical application demand data for the cloud-based application and historical application capacity data for the cloud-based application;

determining a set of constraints associated with the cloud-based application;

determining perfect application capacity data for the cloud-based application based on the historical application demand data for the cloud-based application and the set of constraints associated with the cloud-based application, wherein the perfect application capacity data comprises at least one of economically perfect application capacity data for the cloud-based application or technically perfect application capacity data for the cloud-based application; and identifying, based on at least a portion of the perfect application capacity data for the cloud-based application and at least one of the historical application demand data for the cloud-based application or the historical application capacity data for the cloud-based application, an opportunity to improve elastic capacity management for the cloud-based application.

21. A method, comprising:

receiving, by a processor, historical application data for a cloud-based application, wherein the historical application data comprises historical application demand data for the cloud-based application and historical application capacity data for the cloud-based application;

determining, by the processor, a set of constraints associated with the cloud-based application;

determining, by the processor, perfect application capacity data for the cloud-based application based on the historical application demand data for the cloud-based application and the set of constraints associated with the cloud-based application, wherein the perfect application capacity data comprises at least one of economically perfect application capacity data for the cloud-based application or technically perfect application capacity data for the cloud-based application; and identifying, by the processor, based on at least a portion of the perfect application capacity data for the cloud-based application and at least one of the historical application demand data for the cloud-based application or the historical application capacity data for the cloud-based application, an opportunity to improve elastic capacity management for the cloud-based application.

* * * * *